Feb. 12, 1924.
L. P. BRANDEWIE
1,483,772
COW TAIL HOLDER
Filed April 23, 1923
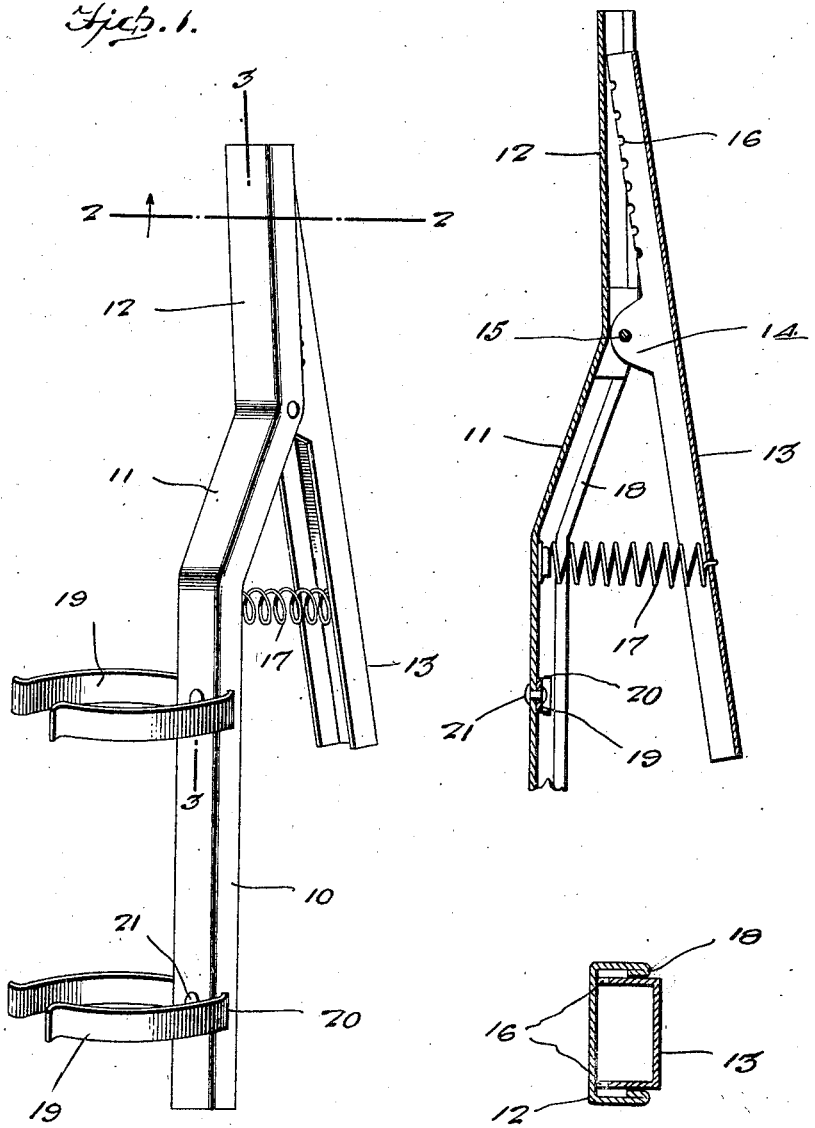
L. P. Brandewie INVENTOR Patented Feb. 12, 1924.

1,483,772

UNITED STATES PATENT OFFICE.

LEO PETER BRANDEWIE, OF HOUSTON, OHIO.

COW-TAIL HOLDER.

Application filed April 23, 1923. Serial No. 634,084.

*To all whom it may concern:*

Be it known that I, LEO P. BRANDEWIE, a citizen of the United States, residing at Houston, in the county of Shelby and State of Ohio, have invented new and useful Improvements in Cow-Tail Holders, of which the following is a specification.

This invention relates to devices for holding the tail of a cow during milking and has for its object the provision of a novel device of this character designed to be clamped upon the leg of the operator and provided with a spring clamp for engagement with the cow's tail whereby to restrain the cow from switching her tail around, an occurrence which is extremely annoying and also unsanitary inasmuch as the tail frequently switches into the pail of milk.

An important object is the provision of a device of this character which is of such a construction that it may be left upon the operator's leg while he is moving about from place to place within the barn or stable where the milking is carried on so that it will be unnecessary to remove the device and replace it when milking the successive cows.

An additional object is the provision of a device of this character which will be simple and inexpensive to manufacture, easy to use, positive in operation, efficient and durable in service and a general improvement in the art.

With the above and other objects and advantages in view the invention consists in the details of construction to be hereinafter more fully described and claimed and illustrated in the accompanying drawings, in which:

Figure 1 is a perspective view of the device,

Figure 2 is a cross section on the line 2—2 of Figure 1 and

Figure 3 is a detail section on the line 3—3 of Figure 1.

Referring more particularly to the drawings I have shown my device as comprising an elongated bar 10 of channel shape having one end portion offset as indicated at 11 and terminating in a jaw 12. Co-operating with this jaw is a clamping device which consists of an elongated bar 13 likewise channel shaped and having its opposite sides formed with ears 14 received between the sides of the jaw 12 and pivoted by a bolt or rivet 15. The opposite edges of this member 13 are formed with notches 16 which make the edges toothed to prevent slipping. The jaw 13 is held in clamping relation to the jaw 12 by means of a suitable coil spring 17 which is mounted as shown.

For the purpose of stiffening the bar 10 it is preferable that the sides thereof be rolled at the edges to define beads 18, though it should be understood that this feature is not absolutely essential as it might be omitted without detracting from the utility of the device.

Carried by the bar 10 are clips 19 similar to trouser guards for bicyclists and these slips are formed as open loops. It is of course conceivable that they may be held upon the bar 10 in different ways, though in actual practice I form the opposite sides of the bar 10 with slots 20 through which the clips pass and these clips are riveted to the bar as shown at 21.

In the use of the device the clips 19 are engaged upon the leg of the operator and the clamp is engaged upon the tail of the cow being milked. The spring 17 operates to hold the two jaws in clamping relation and the notches 16 operate to improve the efficiency of the grip of the clamp upon the cow's tail, so that the cow cannot wrench her tail out of the device. It will be seen that the device may be left upon the leg of the operator while he moves about from place to place in the barn or stable without any inconvenience, it being merely necessary then for him to engage the clamp upon the tails of the successive cows as they are milked.

From the foregoing description and a study of the drawings it will be apparent that I have thus provided a simply constructed and consequently inexpensive device which will be highly efficient for the purpose specified and which on account of the fewness of parts is not likely to get out of order.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention, I claim:

1. A cow tail holder comprising an elongated bar having clamps engageable upon the operator's leg, and having one end provided with a spring clamp engageable with a cow's tail, the bar being formed with slots through which the clamps are engaged.

2. A holder of the character described comprising an elongated bar having open loop like clips engageable upon the leg of the operator, one end portion of said bar constituting a jaw, a second bar pivotally connected with the first named bar and constituting a jaw co-operating with the first named jaw, and a spring for urging said jaws into clamping relation, both bars being of channel formation and one fitting within the other.

3. A holder of the character described comprising an elongated bar having open loop like clips engageable upon the leg of the operator, one end portion of said bar constituting a jaw, a second bar pivotally connected with the first named bar and constituting a jaw co-operating with the first named jaw, and a spring for urging said jaws into clamping relation, both bars being channel shaped in cross section and the second named bar fitting within the first named bar and having its side edges notched.

4. A device of the character described comprising an elongated channel shaped bar having one end constituting a jaw, a second bar pivotally connected with said first named bar and constituting a jaw co-operating with the first named jaw, and means for holding the device upon the leg of the wearer, consisting of open loop like clips secured to the first named bar, the side edges of the first named bar being formed with slots within which said clips are engaged.

In testimony whereof I affix my signature.

LEO PETER BRANDEWIE.